United States Patent
Chen et al.

(10) Patent No.: US 7,193,420 B2
(45) Date of Patent: *Mar. 20, 2007

(54) INSULATED SLEEVE WITH CONDUCTIVE ELECTRODES TO REDUCE BOREHOLE EFFECTS FOR AN INDUCTION TOOL

(75) Inventors: Kuo Chiang Chen, Sugar Land, TX (US); Robert C. Smith, Houston, TX (US); David T. Oliver, Sugar Land, TX (US); Gary A. Hazen, Houston, TX (US); Dean M. Homan, Sugar Land, TX (US); Jan W. Smits, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/334,198

(22) Filed: Jan. 17, 2006

(65) Prior Publication Data
US 2006/0119364 A1    Jun. 8, 2006

Related U.S. Application Data

(60) Division of application No. 11/030,668, filed on Dec. 31, 2004, now Pat. No. 7,023,212, which is a continuation-in-part of application No. 10/707,274, filed on Dec. 2, 2003.

(51) Int. Cl.
*G01V 3/02* (2006.01)
(52) U.S. Cl. ....................... 324/339; 324/351
(58) Field of Classification Search ................ 324/339, 324/351
See application file for complete search history.

(56) References Cited

U.S. PATENT DOCUMENTS

| | | | |
|---|---|---|---|
| 4,264,862 A | 4/1981 | Koelle | |
| 4,319,191 A | 3/1982 | Meador et al. | |
| 4,651,101 A | 3/1987 | Barber et al. | |
| 4,873,488 A | 10/1989 | Barber et al. | |

(Continued)

FOREIGN PATENT DOCUMENTS

GB    2376076    12/2002

(Continued)

*Primary Examiner*—Reena Aurora
(74) *Attorney, Agent, or Firm*—Bryan L. White; Kevin P. McEnaney; William Batzer

(57) ABSTRACT

A well logging tool and method are disclosed comprising a conductive mandrel, an antenna array disposed around the conductive mandrel, wherein the antenna array comprises a plurality of antennas disposed on insulating supports and at least one contact spacer, the at least one contact spacer having at least one conductor channel having a contact assembly disposed therein, a sleeve disposed over the antenna array, wherein the sleeve includes at least one electrode assembly, the at least one electrode and the contact assembly adapted to provide a radially conductive path from an exterior of the well logging tool to the conductive mandrel and wherein the electrode assembly comprises a first conductor exposed to the exterior of the well logging tool and at least one second conductor conductively connected to the first conductor and exposed to an inner surface of the sleeve, wherein at least one of the first conductor or the second conductor being in sealed contact with the sleeve to prevent the passage of fluid through the sleeve.

8 Claims, 12 Drawing Sheets

U.S. PATENT DOCUMENTS

| | | |
|---|---|---|
| 5,041,975 A | 8/1991 | Minerbo et al. |
| 5,058,077 A | 10/1991 | Twist |
| 5,115,198 A | 5/1992 | Gianzero et al. |
| 5,235,285 A | 8/1993 | Clark et al. |
| 5,508,616 A | 4/1996 | Sato et al. |
| 5,757,191 A | 5/1998 | Gianzero |
| 5,781,436 A | 7/1998 | Forgang et al. |
| 6,044,325 A | 3/2000 | Chakravarthy et al. |
| 6,147,496 A | 11/2000 | Strack et al. |
| 6,163,155 A | 12/2000 | Bittar |
| 6,297,639 B1 | 10/2001 | Clark et al. |
| 6,304,086 B1 | 10/2001 | Minerbo et al. |
| 6,351,127 B1 | 2/2002 | Rosthal et al. |
| 6,380,744 B1 | 4/2002 | Clark et al. |
| 6,483,310 B1 * | 11/2002 | Meador ............... 324/338 |
| 6,541,979 B2 | 4/2003 | Omeragic |
| 6,556,015 B1 | 4/2003 | Omeragic et al. |
| 6,557,794 B2 | 5/2003 | Rosthal et al. |
| 6,566,881 B2 | 5/2003 | Omeragic et al. |
| 6,573,722 B2 | 6/2003 | Rosthal et al. |
| 6,584,408 B2 | 6/2003 | Omeragic |
| 6,667,620 B2 | 12/2003 | Homan et al. |
| 6,933,726 B2 | 8/2005 | Chen et al. |
| 2003/0085707 A1 | 5/2003 | Minerbo et al. |

FOREIGN PATENT DOCUMENTS

| | | |
|---|---|---|
| GB | 2388664 | 11/2003 |
| GB | 2393255 | 3/2004 |
| GB | 24044742 | 2/2005 |

\* cited by examiner

INSULATED SLEEVE WITH CONDUCTIVE ELECTRODES TO REDUCE BOREHOLE EFFECTS FOR AN INDUCTION TOOL

CROSS REFERENCE TO RELATED APPLICATIONS

This application is a divisional of Ser. No. 11/030,668 filed Dec. 31, 2004 now U.S. Pat. No. 7,023,212 which is a continuation in part of U.S. patent application Ser. No. 10/707,274 filed Dec. 2, 2003.

BACKGROUND OF INVENTION

1. Field of the Invention

This invention relates generally to the field of electromagnetic (EM) well logging. More particularly, the invention concerns devices for reducing and/or correcting for the effects of the borehole on an overall subsurface formation measurement.

2. Background Art

Induction and propagation logging techniques have been employed in hydrocarbon and water exploration and production operations for many years to measure the electrical conductivity (or its inverse, resistivity) of subsurface formations. These techniques entail the deployment of antennas into a borehole to emit EM energy through the borehole fluid (also referred to herein as mud) and into the subsurface formations. Conventional logging techniques include "wireline" logging, logging-while-drilling (LWD), and logging-while-tripping (LWT). Wireline logging entails lowering the antennas into the borehole on a "sonde" or support at the end of an electrical cable to obtain the subsurface measurements as the instrument is moved along the borehole. LWD entails mounting the antennas on a support connected to a drilling assembly to obtain the measurements while a borehole is being drilled through the formations. LWT involves placing a support equipped with antennas near the bottom of the drill string and making measurements while the string is withdrawn from the borehole.

Conventional antennas are formed from coils of the cylindrical solenoid type comprised of one or more turns of insulated conductor wire wound around a support. These antennas are typically operable as sources and/or sensors. In operation, a transmitter antenna is energized by an alternating current to emit EM energy. The emitted energy interacts with the mud and the formation, producing signals that are detected and measured by one or more of the antennas. The detected signals are usually expressed as a complex number (phasor voltage) and reflect the interaction with the mud and the formation. By processing the detected signal data, a profile of the formation and/or borehole properties is determined.

A coil carrying a current can be represented as a magnetic dipole having a magnetic moment proportional to the current and the area encompassed by the coil. The direction and strength of the magnetic dipole moment can be represented by a vector perpendicular to the area encompassed by the coil. In conventional induction and propagation logging systems, the antennas are typically mounted on a metallic "sonde" or support with their axes along the longitudinal axis of the support. Thus, these instruments are implemented with antennas having longitudinal magnetic dipoles (LMD). U.S. Pat. No. 4,651,101 describes a logging sonde implemented with LMD antennas. When such an antenna is placed in a borehole and energized to transmit EM energy, currents flow around the antenna in the borehole and in the surrounding formation. There is no net current flow up or down the borehole.

An emerging technique in the field of well logging is the use of instruments incorporating antennas having tilted or transverse coils, i.e., where the coil's axis is not parallel to the support axis. An antenna with its axis perpendicular to the support axis is usually referred to as a transverse antenna. These instruments are thus implemented with antennas having a transverse or tilted magnetic dipole (TMD). One particular implementation uses a set of three coils having non-parallel axes (referred to herein as tri-axial). The aim of these TMD configurations is to provide EM measurements with directional sensitivity to the formation properties. Transverse magnetic fields are also useful for the implementation of nuclear magnetic resonance based methods. U.S. Pat. No. 5,602,557, for example, describes an arrangement that has a pair of "saddle-coil" conductor loops lying opposite one another and rotationally offset 90° relative to one another. Other instruments equipped with TMDs are described in U.S. Pat. Nos. 6,163,155, 6,147,496, 5,757,191, 5,115,198, 4,319,191, 5,508,616, 5,757,191, 5,781,436, 6,044,325, 4,264,862 and 6,147,496.

If a transmitter is placed in a homogeneous medium, currents will flow in paths surrounding the transmitter. When a borehole is added, these current paths are distorted. These currents induce a voltage in a receiver displaced from the transmitter. This voltage is an indication of the resistivity of the formation. If instead of a homogeneous medium, we include a borehole, then the current paths are altered and hence the received voltage is different from what would be measured in the absence of a borehole. This difference is called the "borehole effect." The difference in borehole effect between a LMD-based tool and a TMD-based tool is due to the difference between the distortion of the currents in the presence of a borehole.

A particularly troublesome property of the TMD is the extremely large borehole effect that occurs in high contrast situations, i.e., when the mud in the borehole is more conductive than the formation. When a TMD is placed in the center of a borehole, there is no net current along the borehole axis. When it is eccentered in a direction parallel to the direction of the magnetic moment, the symmetry of the situation insures that there is still no net current along the borehole axis. However, when a TMD is eccentered in a direction perpendicular to the direction of the magnetic moment, axial currents are induced in the borehole. In high contrast situations these currents can flow for a very long distance along the borehole. When these currents pass by TMD receivers, they can cause signals that are many times larger than would appear in a homogeneous formation without a borehole, resulting in erroneous measurements.

U.S. Pat. No. 4,319,191 (assigned to the present assignee) describes a sensor assembly aimed at protecting a solenoid from the borehole environment. U.S. Pat. No. 5,041,975 (assigned to the present assignee) describes a technique for processing signal data from well logging measurements in an effort to correct for the effects of the borehole. U.S. Pat. No. 5,058,077 describes a technique for processing downhole sensor data in an effort to compensate for the effect of eccentric rotation on the sensor while drilling. U.S. Pat. No. 5,781,436 describes a technique for measuring the conductivity of earth formations by making subsurface EM measurements at multiple frequencies and preselected amplitudes. However, none of these patents relates to the properties or effects of TMDs in subsurface measurements.

U.S. Pat. No. 6,667,620 (assigned to the present assignee) describes an insulating sleeve arrangement slideably coupled to cover a sensor assembly containing TMDs from direct contact with the borehole. The sleeve includes a series of electrically conductive elements in alignment with the longitudinal axis of the tool body. The conductive elements are connected to the internal tool body via a conductor impregnated within the sleeve material. The mechanical design of the impregnated conductors may allow the risk of fluid leakage of oil from under the sleeve to the borehole or water or other borehole fluid through the sleeve to the sensor assembly or tool support. Furthermore, manufacturing costs of impregnating conductors within the sleeve warrant consideration of less expensive alternatives.

Thus there remains a need for improved methods and apparatus for handling the flow of undesired axial currents along the borehole.

SUMMARY

A well logging tool and method are disclosed comprising a conductive mandrel, an antenna array disposed around the conductive mandrel, wherein the antenna array comprises a plurality of antennas disposed on insulating supports and at least one contact spacer, the at least one contact spacer having at least one conductor channel having a contact assembly disposed therein, a sleeve disposed over the antenna array, wherein the sleeve includes at least one electrode assembly, the at least one electrode and the contact assembly adapted to provide a radially conductive path from an exterior of the well logging tool to the conductive mandrel and wherein the electrode assembly comprises a first conductor exposed to the exterior of the well logging tool and at least one second conductor conductively connected to the first conductor and exposed to an inner surface of the sleeve, wherein at least one of the first conductor or the second conductor being in sealed contact with the sleeve to prevent the passage of fluid through the sleeve.

BRIEF DESCRIPTION OF DRAWINGS

Other aspects and advantages of the invention will be apparent from the following description and upon reference to the drawings in which.

DETAILED DESCRIPTION

Figure 1A:
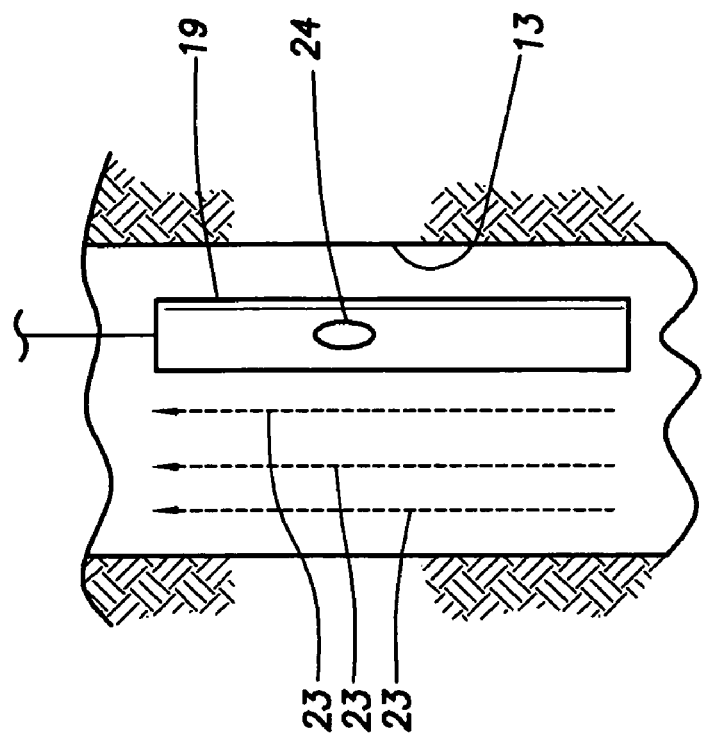
FIG. 1a shows a schematic diagram of a conventional logging instrument and associated axial borehole currents.
Figure 1:
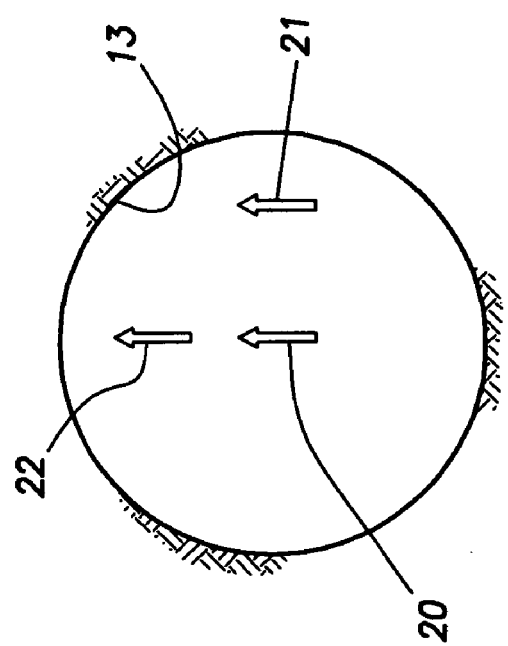
FIG. 1 shows a pictorial; looking downhole of parallel and perpendicular eccentering of a tilted or transverse magnetic dipole within a borehole.

FIGS. 1 and 1a are used herein to describe briefly the problem presented by borehole induced currents to a well logging tool operation. FIGS. 2–7 depict exemplary systems, apparatus, and methods for addressing this problem, in accordance with the present invention. For purposes of description, the following Detailed Description focuses primarily on an electromagnetic (EM) induction logging operation to describe the inventive systems, apparatus, and method(s) of reducing the induced borehole currents.

As noted above, the presence of borehole induced currents caused by tool eccentering can compromise the quality of well logging measurements. Referring to FIG. 1, a transverse or tilted magnetic dipole (TMD) 20 that is normally positioned at the center of the borehole 13 may be eccentered in two possible orientations. These two orientations are referred to as longitudinal eccentering (parallel to the direction of the magnetic dipole of the antenna) and transverse eccentering, represented by dipole 22 and dipole 21, respectively. A longitudinal eccentered dipole 22 produces eddy currents in the borehole 13. However, because the eddy currents are symmetric about the plane of the borehole 13 and the dipole movement, no net current flows are created up or down the borehole 13. Thus, a tool with a longitudinally eccentered dipole 22 does not generate undesirable borehole effects. In contrast, a tool that has a transverse eccentered dipole 21 induces eddy currents to flow up and down the borehole 13, but without the symmetry to cancel out the up and down currents. As a result, a transversely eccentered dipole 21 gives rise to significant borehole currents. FIG. 1a illustrates such a well logging tool 19 having a transversely eccentered dipole operating in a borehole 13 and generating borehole currents 23. These borehole currents 23 deliver a strong signal to a receiver 24 that is disposed on a well logging tool 10, thereby compromising the quality of the measurement.

Figure 2:
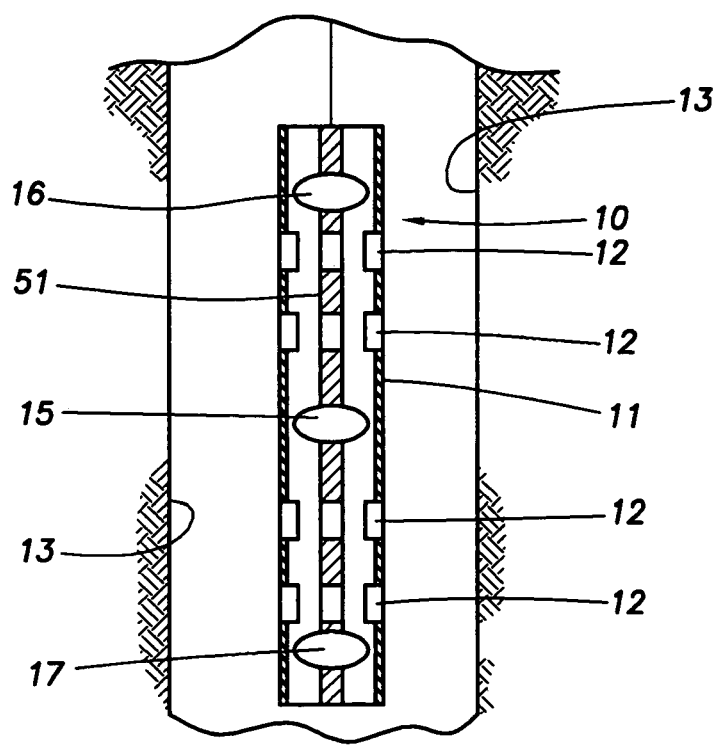
FIG. 2 shows the logging instrument of FIG. 2a implemented with the shielding bodies in accord with the invention.
Figure 2A:
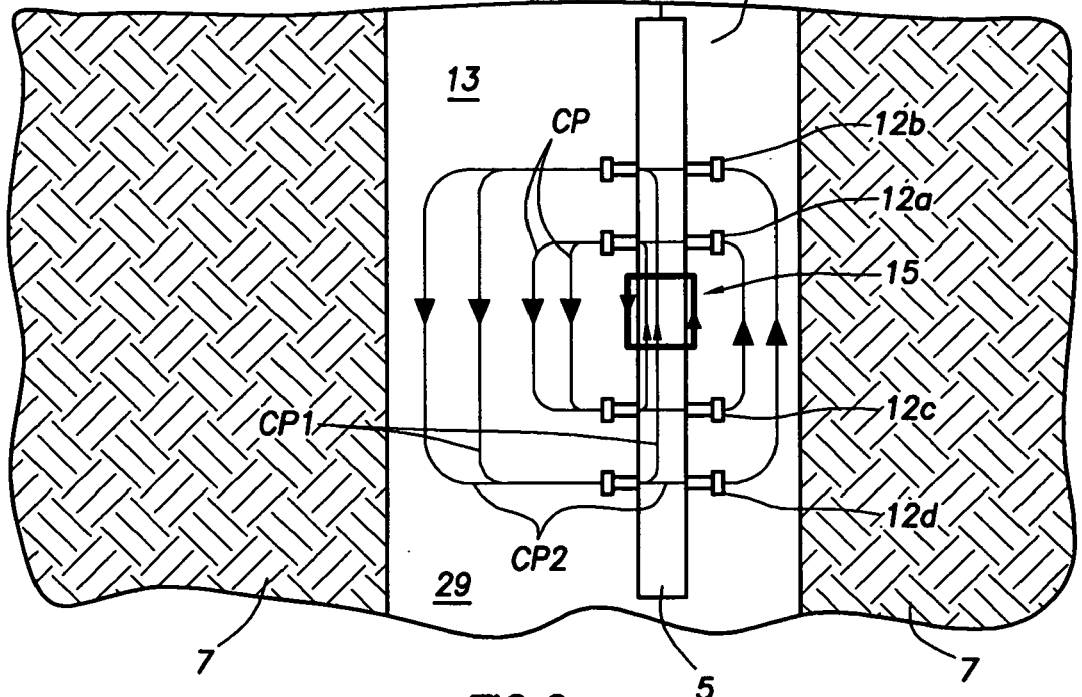
FIG. 2a shows a schematic diagram of a conventional logging instrument equipped with a tilted or transverse magnetic dipole antenna.

In one aspect of present invention, the apparatus and method provides a simple and cost-effective solution to the above-mentioned problem presented by borehole currents. More particularly, the inventive system, apparatus and method are employed to address the borehole currents by providing preferably radial conductive paths that route borehole currents through an inner mandrel of the tool, thereby reducing or eliminating the borehole currents passing by and influencing the receiver antenna. FIG. 2 illustrates, in a simplified schematic, a well logging tool 10 and system for addressing such borehole currents. FIG. 2a illustrates the borehole current patterns resulting from the use of the inventive well logging tool 10.

Referring to the schematic of FIG. 2, a well logging tool 10 according to one embodiment of the present invention, has a plurality of antenna arrays each disposed around a conductive mandrel 51 and spaced apart from one another thereon at different longitudinal or axial positions. In this embodiment, the antenna array includes a transmitter 15, an upper receiver 16 positioned above the transmitter 15, and a lower receiver 17 positioned below the transmitter 15. In another preferred embodiment, the receivers (two or more) are located and spaced apart below (or above) the transmitter. The transmitter 15 and the receivers 16, 17 may be LMDs, TMDs, or a combination thereof. The transmitter 15 and receivers 16, 17 are typically disposed on nonconductive support members (not shown in FIG. 2), which are disposed about the conductive mandrel 51. The non-conductive support member provides, therefore, a buffer between the conductive mandrel 51 and the antennas 15, 16, 17. The antennas 15, 16, 17 may be solenoid-type coil antennas, loop antennas, or any coil construction resulting in a transverse magnetic dipole.

The antennas 15, 16, 17 are disposed radially inward and thus, inside of, and thereby protected by, an insulating sleeve 11 that provides the substantial outer surface of the tool 10. The sleeve 11 is sealingly attached to the rest of the tool 10, during the final stages of assembly, by sliding it over the assembly of antennas 15, 16, 17 and mandrel 51. It is noted then that the connection between electrodes 12 on the sleeve 11 and the inner mandrel 51 cannot be conveniently hard-wired (at least, initially) because the sleeve 11 is installed after and independently of, the mandrel 51 and antennas 15, 16, 17. The sleeve 11 may be made of any durable insulating material that is typically used in the industry, for example, a composite material, elastomer or rubber.

Figure 3:
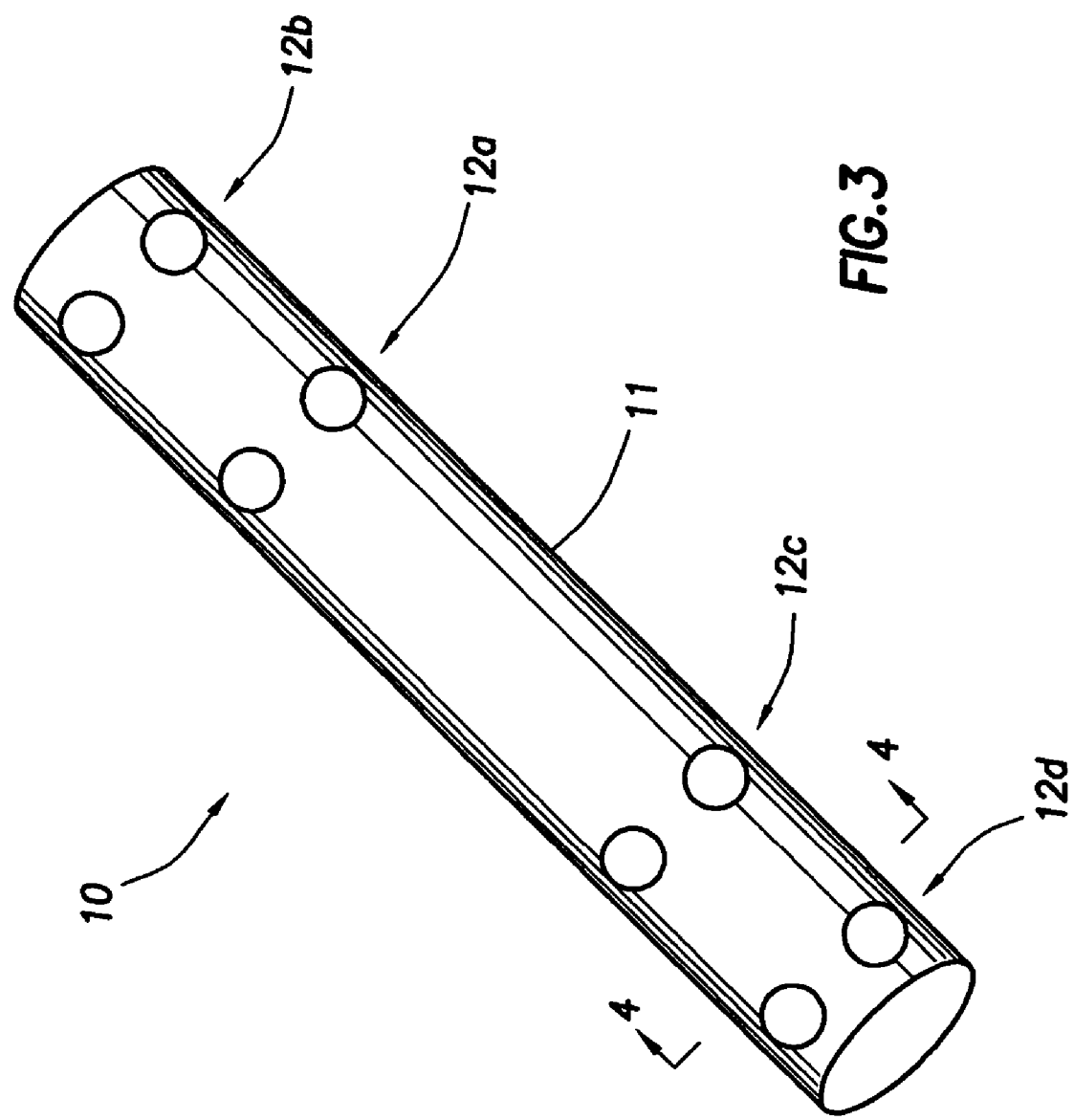
FIG. 3 is a schematic diagram of a conductive element pattern on a shielding body in accord with the invention and projected unto a two-dimensional surface.

Referring also to FIG. 3, a plurality of electrodes 12 are radially embedded in the sleeve 11 such that an outer surface portion of each electrode 12 is exposed on the outside surface of the sleeve 11 and thus, to the environment of the borehole 13 during operation. The transmitter 15 is positioned longitudinally so as to be bracketed above and below by electrodes 12. The electrodes 12 may be singular (e.g., button) electrodes as in FIGS. 2–7, or annular (encircling the sleeve), for example, banded or ring electrodes. In further embodiments described below, the electrodes 12 are slotted, metallic plates (see e.g.,FIGS. 7). An embodiment that employs singular electrodes 12 may have multiple electrodes 12 or sets that are azimuthally positioned about the same longitudinal position along the tool axis, as illustrated in FIGS. 2 and 3). The electrodes 12 may be made of any durable conductive material that is typically used in the industry or that would be appreciated by one of ordinary skill in the art. In a preferred embodiment, the sleeve 11 and the electrodes 12 are both made of materials sufficiently durable to resist or limit erosion (or wear) caused by rubbing against the borehole wall 14 or corrosion caused by the caustic nature of the environment of the borehole 13.

Applicants recognize that the use of various materials for tool components may provide components with different rates of thermal expansion, and may result in undesirable stresses, cracking, fatigue, and failure upon or after prolonged exposure to high-temperature borehole environments. Certain embodiments of the invention address these conditions by utilizing components or configurations that accommodate the different thermal expansion rates of the tool components. Further embodiments of the invention provide a configuration that allow for the conductive connection between the electrodes to take place after the sleeve 11 is positioned over the antennas 15, 16, 17.

In the embodiments of FIGS. 2 and 3, the insulating sleeve 11 includes a plurality of azimuthally spaced apart "button" type electrodes 12 embedded in the surface sleeve 11 material. As described previously, the sets of button electrodes 12 are longitudinally or axially positioned so as to saddle the transmitter 15. In the illustrated preferred embodiment, there are two sets or groups 12a, 12b of button electrodes 12 positioned above the transmitter 15 and two sets or groups 12c, 12d of button electrodes 12 positioned below the transmitter 15. Each set or group 12a–12d include eight azimuthally spaced apart button type electrodes 12. It should be noted that in further embodiments of the invention, the number of electrodes may vary.

Figure 4:
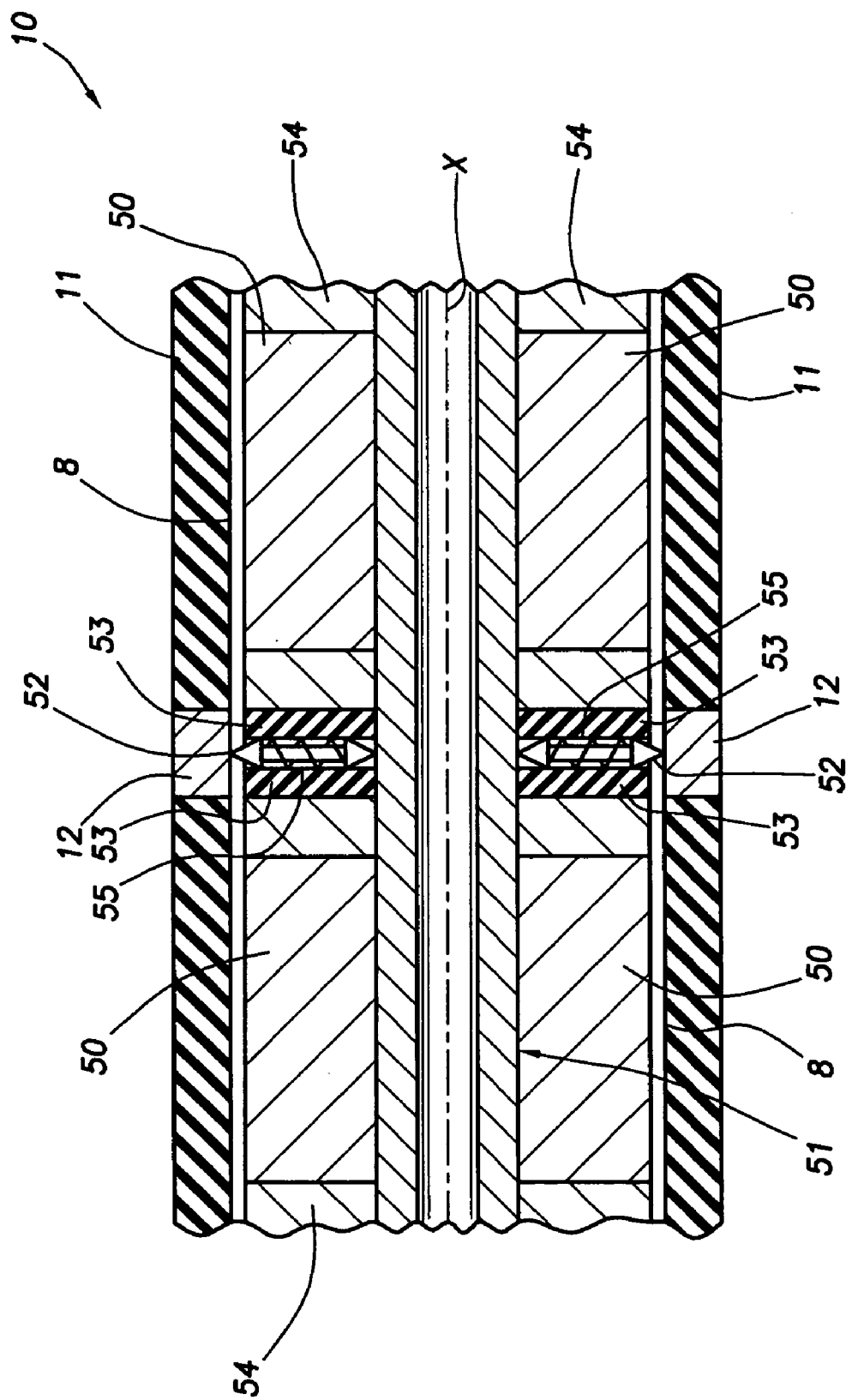
FIG. 4 is a cross sectional view of an electrode and shield combination.

The cross-sectional view of FIG. 4 depicts a portion of a fully assembled well logging tool 10, according to the present invention. The logging tool includes a centrally situated and longitudinally extending inner mandrel 51 (having a longitudinal axis generally parallel with the borehole axis). In the present invention, the inner mandrel 51 is a "conductive mandrel" that may take the form of a metal rod, and other suitable forms. As also shown in FIG. 4, an antenna is assembled and positioned about the inner mandrel 51. The typical antenna array includes spacer assemblies disposed between the antennas. The assembly consists of spacers 54, bobbins 50 positioned longitudinally within spacers 54, and contact spacers 53 positioned longitudinally within the bobbins 50. Each of these elements is assembled snugly about the mandrel 51 and radially inward and inside of sleeve 11. As shown in FIG. 4, the pair of contact spacers 53 form a radially extending channel 55 therebetween. Positioned within the channel 55 is a conductive assembly or conductive member 52 extending past the depth of the channel 55. As will become apparent with the description provided below, the conductive member 52 makes contact (i.e., electrical contact) with both the mandrel 51 and the electrode 12, thereby providing a radially directed current path therebetween. When the borehole environment, i.e., drilling mud, is also conductive, resulting in a conductive path between the borehole environment and the mandrel 51 is provided.

The insulating sleeve 11 is conveniently positioned about the antennas 15, 16, 17 and mandrel 51 such that the electrode 12 is longitudinally or axially aligned for contact with the conductive member 52. The primary function of the insulating sleeve 11 is to cover and protect the antenna array. As a minimum, the insulating sleeve 11 includes a nonconductive portion 11a and a hole or channel 8 that helps retain an electrode 12. With reference also to FIG. 3, the button electrodes 12 are embedded in the sleeve 11 such that an inner surface faces radially inward of the sleeve 11.

For purposes of the present invention, it should be noted that the conductive member 52 may take one of several suitable shapes. For example, in one application, the conductive member is an integral part of the contact spacer 53. In this embodiment, the interfaces between the electrode 12 and the conductive member 52 and between the conductive member 52 and the mandrel 51 are not hardwired. This is preferred because, as discussed above, the sleeve 11, the antenna array, and the conductive mandrel 51 may exhibit significantly different rates of thermal expansion when the tool 10 is exposed to elevated temperatures.

FIG. 2a illustrate the borehole current path loops CP generated (and diverted) during operation of the well logging tool 10 with a transversely eccentered dipole and in a borehole 13 having drilling mud 29 that is conductive with a surrounding formation 7. FIG. 2a illustrates, more specifically, the current path loops CP generated as a result of operating the inventive system for addressing the borehole currents. In contrast to the axially flowing borehole currents depicted in FIG. 1a, the borehole currents are shorted along looped current path loops CP around the transmitter 15, and away from the receivers 16, 17. In this way, the borehole currents effect on the receivers are manageable.

As discussed previously, the sets 12a–12d of button electrodes 12 saddle or bracket the transmitter 15. The sets 12a–12d of electrodes 12 are conductively connected to each other through the conductive mud, the conductive member 52, and the mandrel 51. The current path CP1, CP2 is shorted within the local area around the transmitter antenna 15 (when button electrodes 12 of sets 12b, 12c are exposed to the borehole mud), thereby significantly attenuating the up and down current flow which would otherwise be present.

It should be noted that current paths CP can be categorized in two ways. In a first current path CP1, the borehole is directed through the following loop: conductive mud 29—button electrode 12—conductive member 52—mandrel 51—conductive member 52—button electrode 12—conductive mud 29. In this current path CP1, the directed current flows through the mandrel 51 and beneath the transmitter 15. In the second current path CP2, the borehole current is directed through the following loop: conductive mud 29—button electrode 12—conductive member 52—mandrel 51—conductive member 52—button electrode 12—conductive mud 29—button electrode 12—conductive member 52—mandrel 51—conductive member 52—button electrode 12—conductive mud 29. Both current paths CP1, CP2 describe a closed current loop. Both current path loops CP1, CP2 include at least two radially directed conductive paths (i.e., a portion of the path loop) between the conductive mud 29, an electrode, and the mandrel 51. Thus, with the aid of conductive electrodes 12 and conductive contacts 52, the current paths are restricted within the local area around the transmitter antenna 15. In this manner, the borehole current effect on the receivers 16, 17 is greatly reduced or eliminated.

It should be noted that the inventive system and method also operates to minimize the influence of shoulder-bed effects on the response signal. The same methodology described above applies in the same manner to localize undesirable currents excited by the transmitter.

Figure 5:
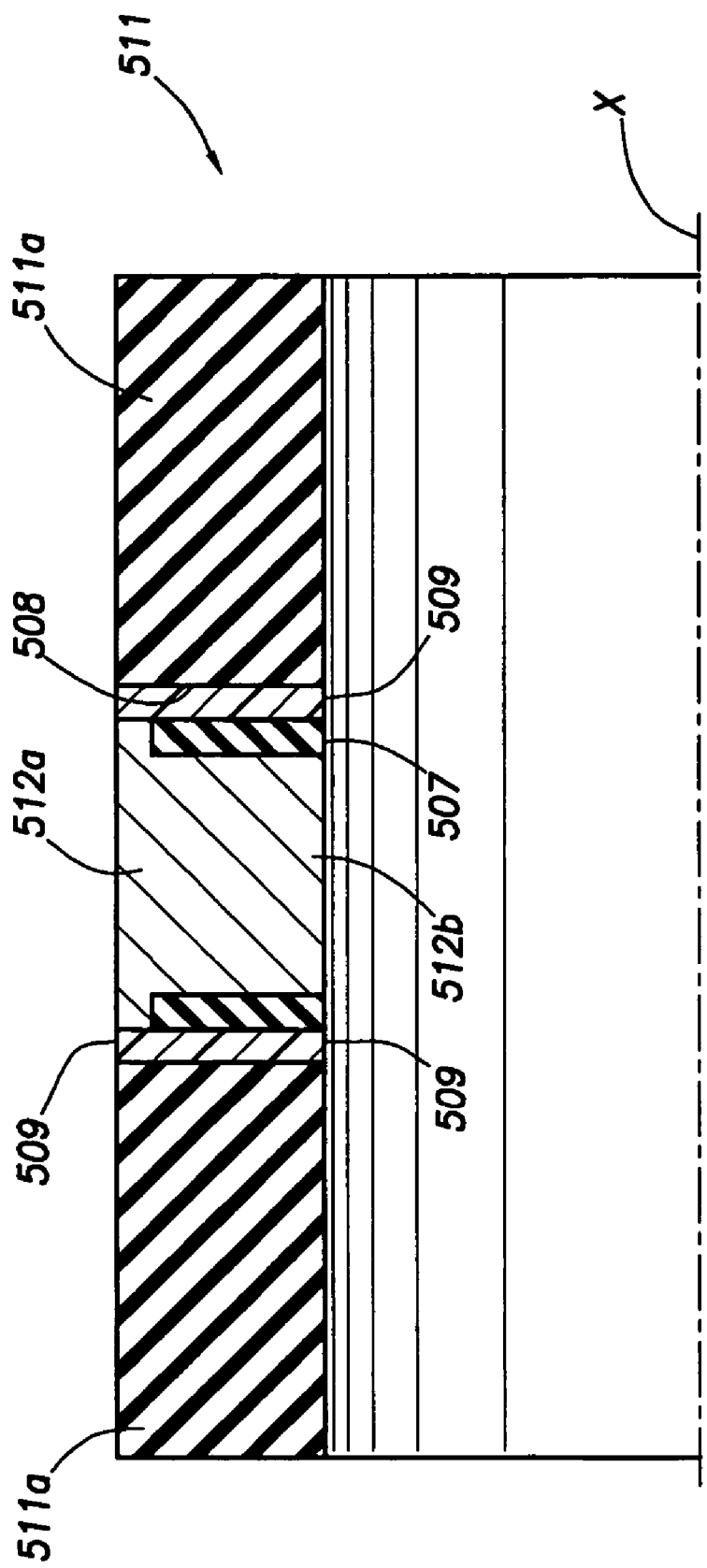
FIG. 5 is a cross sectional view of an electrode embedded in a sleeve.

Referring now to FIG. 5, in an alternative embodiment of the present invention, an insulating sleeve 511 includes or retains a cylindrical button electrode 512 with a T-shaped cross section. The insulating sleeve material 511a of the sleeve 511 includes a channel or hole 508 drilled therein and in which button electrodes 512 are situated. The button electrode 512 has a top or external section 512a that is larger than a radially inwardly extending base section 512b. As shown in FIG. 5, rubber sleeves 507 are wrapped about the base section 512b of the electrode 512, and then the interface between the electrodes 512 and the rubber sleeve 507 is sealed by glue. Alternatively, the seal may be formed by molding the rubber material directly onto the side of the cylindrical button electrode 512. Preferably, epoxy material 509 is placed between the electrode 512 and the rubber sleeve 507 and the insulating sleeve material 511a.

By providing rubber sleeve 507 between the metallic electrode 512 and the composite sleeve 511 (and epoxy material 508), flexibility is imparted to the entire ("dynamic") assembly. Accordingly, the different rates of thermal expansion of the elements are accommodated. Among other things, this also guards against the creation of microcracks which may form after several thermal expansion cycles and serve as potential leak paths.

Figure 6:
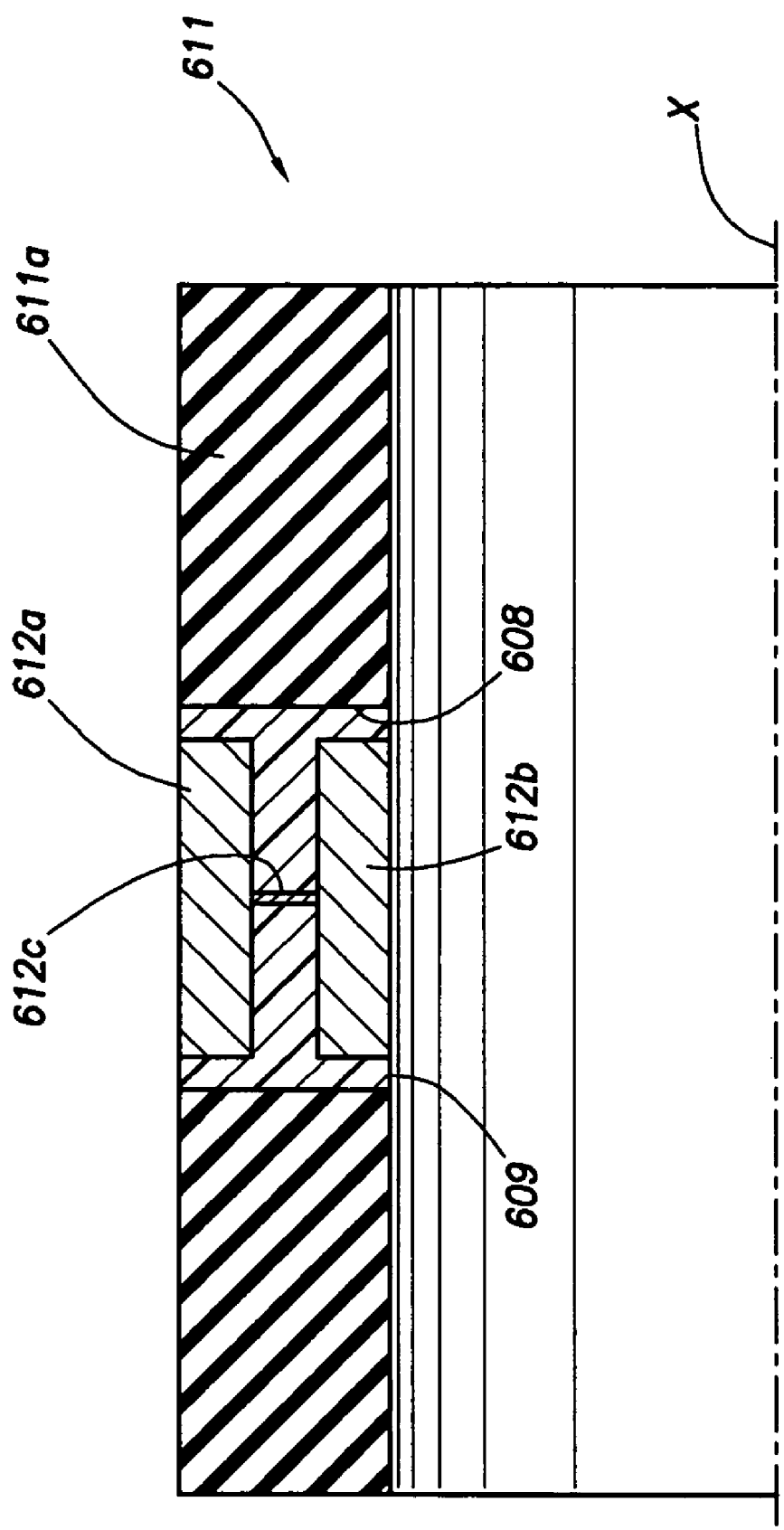
FIG. 6 is a schematic diagram of a logging instrument implemented with a shielding body in accord with the invention.

The cross-sectional view of FIG. 6 depicts yet another embodiment of the inventive insulating sleeve according to the present invention. The insulating sleeve 611 includes a non-conductive, insulating material 611a into which multiple holes or channels 608 are drilled and multiple button-type metallic electrodes 612 are embedded. In this particular embodiment, the metallic button electrode 612 has three different, major components: an outer metallic button 612a, an inner metallic button 612b that is substantially similar to the outer metallic button 612a, and a metallic conductor element 612c disposed therebetween. The metallic conductor element 612c provides electrical contact between the outer and inner metallic buttons 612a, 612b. As shown in FIG. 6, the conductor element 612c has a substantially smaller diameter than the outer and inner metallic buttons 612a, 612c. When the holes 608 are drilled in the insulating material 611a (to accommodate the electrode 612), the additional space or void is filled with epoxy material 609. The epoxy material 609 also fills the gap or space between the outer and inner metallic electrodes 612a, 612b.

The conductor element 612c is preferably a wire or other very thin metallic rod. Because the conductor element 612c has such a small diameter relative to the hole or space between the insulating material 611a, any thermal expansion effect in the radial direction of the conductor element 612c is insignificant. Accordingly, the potential for leakage is substantially reduced.

The terms "insulating sleeve" and "composite sleeve" are used herein to refer to the insulating sleeve itself and components supported therein such as the electrode 12. The term "sleeve assembly" may also be used to refer to the combination of the sleeve and the electrodes.

Figure 7A:
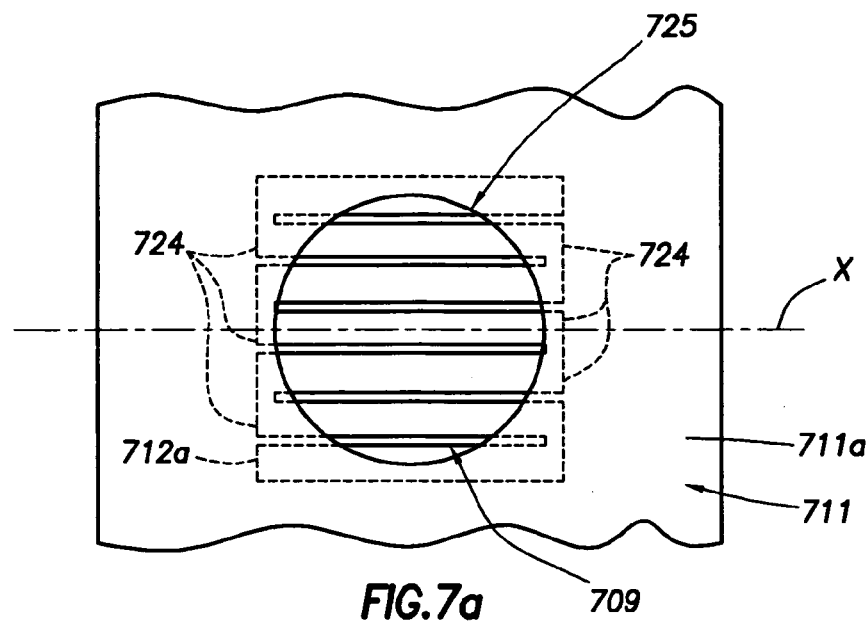
FIG. 7a is a circumferential plan view of the insulating sleeve of FIG. 7.
Figure 7:
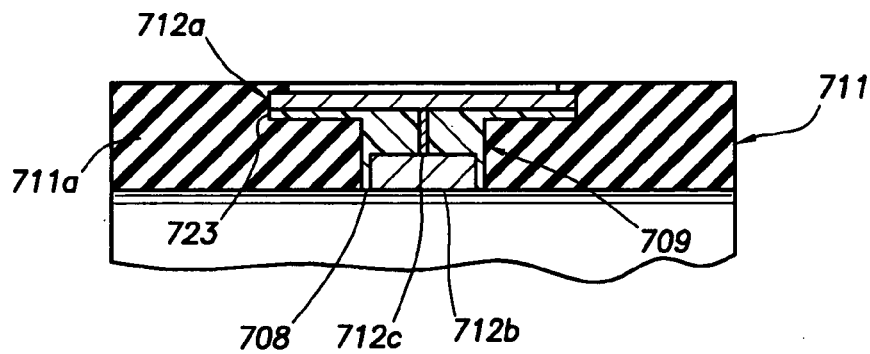
FIG. 7 is a partial cross-sectional view of an insulating sleeve.

FIG. 7 depicts a variation of the insulating sleeve embodiment that supports a multi-component electrode, according to the present invention desirable to increase the exposed surface area of the electrode in order to obtain a certain formation response signal. The embodiment of FIG. 7 provides an electrode 712 having such an enlarged exposed surface. As shown in the partial side view of FIG. 7, an insulating sleeve 711 includes a non-conductive sleeve material 711a having a channel or hole 708 drilled therein and into which one or more metallic button electrodes 712 are embedded.

The multi component electrode 712 includes an outer metallic button 712a, an inner metallic button 712b, and a conductor element 712c positioned therebetween. The inner metallic button 712b has a disc shape with an inside surface that is connected to conductor element 712c. The conductor element 712c has a substantially reduced diameter, giving it more of a rod-like shape.

Further, the insulating sleeve 711 includes an outer metallic button 712a that is substantially larger in respect to its side view dimensions than the inner metallic button 712c. In FIG. 7, the outer metallic button 712a has a rectangular or square shape. The channel or hole 708 includes a circular surface opening 725 and an enlarged recess 723 provided directly beneath the opening 725. The rectangular button electrode 712a fits conveniently and securely within the recess 723. With reference also to FIG. 7a, the rectangular button electrode 712a (see dash outline) has a top metallic surface area that is greater than the area within the opening 725 (i.e., the recess area). Thus, only a central portion of the button electrode 712a is exposed to the borehole environment. Moreover, the button electrode 712 is advantageously embedded below or inward of the surface of the insulating sleeve 711 and thus, less likely to be damaged by contact with elements in the borehole environment.

Figure 7B:
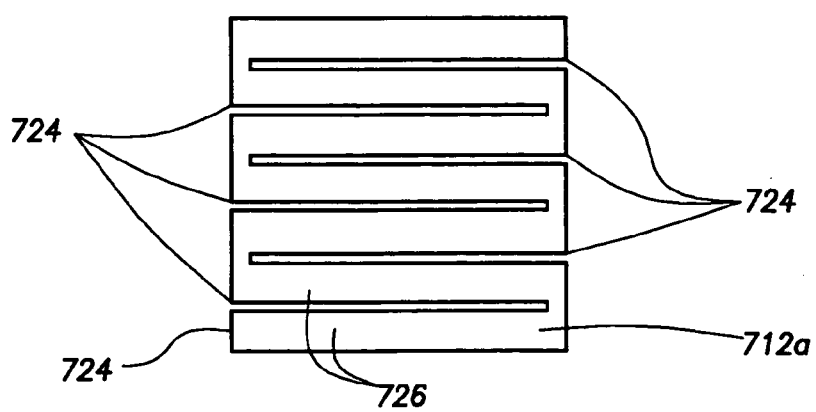
FIG. 7b is a plan view of a slotted metallic plate for use with the insulating sleeve of FIG. 7.

As shown in FIG. 7b, the button electrode 712a has a rectangular periphery, and a plurality of longitudinally extending slots 724 provided thereacross. The slots 724 divide the exposed metallic surface of the electrode 712a, into multiple, interconnected finger electrodes 726 that are aligned in generally parallel relation. In this embodiment, the total exposed metallic surface of the electrode 712a is advantageously increased (e.g., from previously described embodiments), thereby making it easier for the borehole current to be directed to the electrodes. Normally, increasing the size of the exposed metallic surface provides "circular" areas that are conducive to formation of eddy current loops that can couple back to the receiver. In the present invention, the slots 724 alleviate this potential problem by dissecting the large single metallic surface into a surface having multiple, connected sections that are generally narrow and absent of a large "circular" area in which a large eddy current loop may generate.

It should be noted that, in further embodiments, other configurations and geometries of the button electrode may be employed to achieve the same general objectives, or different specific objectives. For example, the slots 724 in FIGS. 7a and 7b are shown in oriented in generally parallel relation along the longitudinal direction and in parallel with the longitudinal axis of the tool. In other embodiments, the slots may be oriented in parallel relation along the lateral or circumferential direction (perpendicular to the longitudinal axis of the tool).

Also, the opening 725 may take on a different geometry, (e.g., a square). In each of these applications, the opening 725 and the recess 723 provide an advantageously secure fit for the metallic plate of the button electrode 712a. The button electrode 712a is well protected by the sleeve material 711a, thereby rendering more rigidity and stability to the overall assembly. Accordingly, the button electrode 712a and the other components of the electrode 712 are less likely to be damaged (e.g., extracted) by obstacles in the environment. Preferably, the gaps between the electrode component 712a, 712b, 712c and the composite insulating material 711a will be filled with or by epoxy 709. Therefore, in accordance with embodiments of the invention, the contact assembly 62 functions in a dynamic manner to maintain electrical continuity between the borehole environment (i.e., exterior of the tool), which is in contact with the electrode 72, and the conductive mandrel 69 when temperature varies. The number and the radial positioning of the contact assemblies 52 mirror the number and radial positioning of the electrodes 72. These conductive paths allow the currents to flow radially (from exterior of the tool into the axis of the tool) from the borehole environment into the conductive mandrel 51 and eliminate or minimize currents flowing along the borehole axis.

Figure 8:
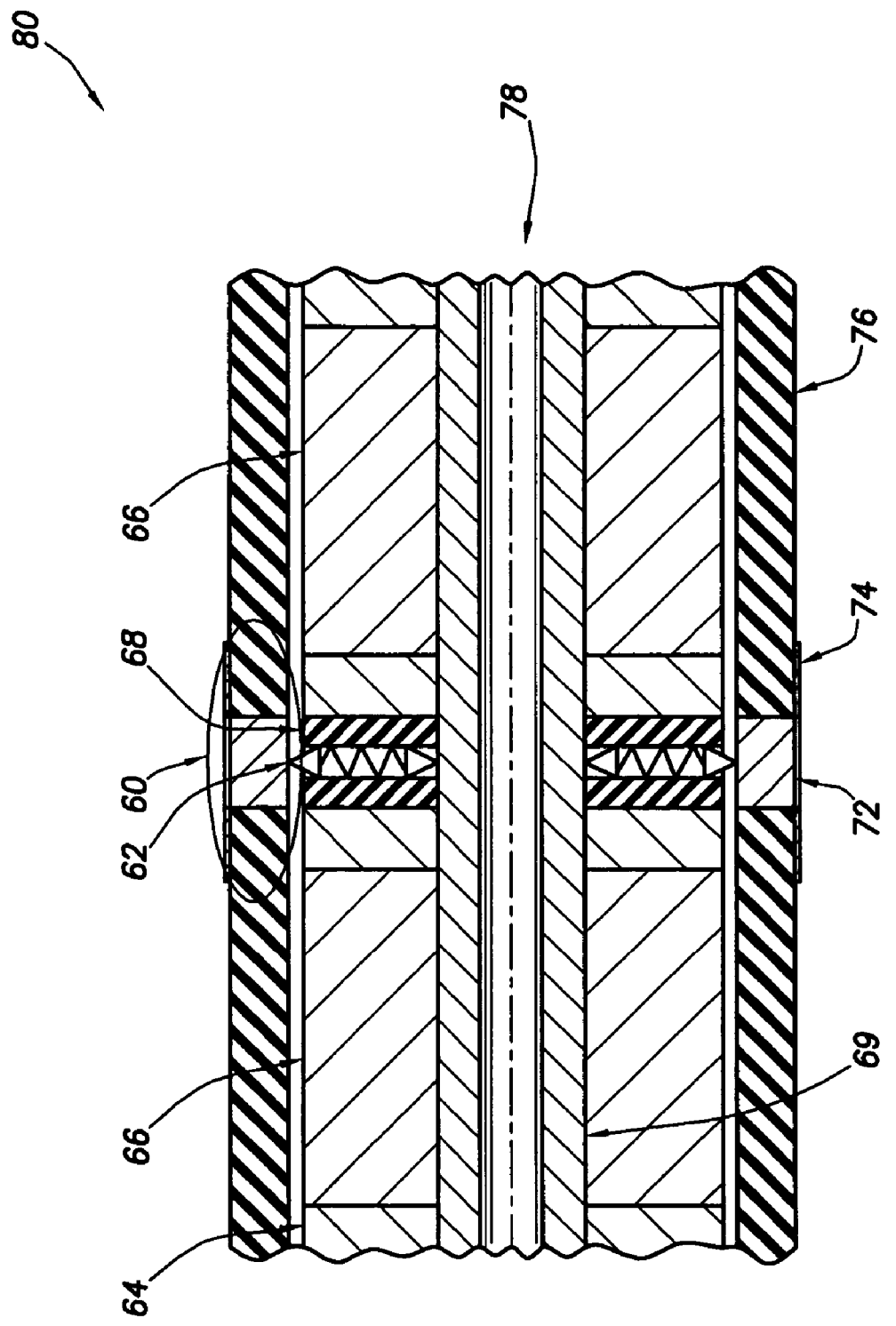
FIG. 8 is a cross section view illustrating a sleeve having surface electrodes.

Turning now to FIG. 8, shown is a simplified embodiment of FIG. 4, illustrating the dynamic contacts 52, combined with FIGS. 7–7b, illustrating a slotted electrode 712a. Shown in FIG. 8 is a partial section 80 of the complete logging tool 78. A similar section 80 occurs at each location of the sleeve 76 that is aligned with a corresponding electrical contact assembly 62. As described herein, the electrical contact assembly 62 may be constructed according to any number of designs so long as current is allowed to effectively pass from the feed-through connector assembly 72 to the metallic array mandrel 69. For example, the electrical contact assembly 62 may be dynamically disposed to expand and contract in a radial direction or may be stationary with a protrusion to contact with the feed-through connector assembly 72. Furthermore, the electrical contact assembly 62 may be constructed as a point contact at one radial position from the mandrel or a ring contact extending azimuthally around all or a portion of the outer surface of the inner bobbin/spacer assembly. For purposes of simplicity, the remaining description assumes a construction of the electrical contact assembly having a spring loaded point contact design.

The contact spacer 68 is preferably made of a non-conductive material. It contains several electrical contact assemblies 62, which are conductive. The number of the electrical contact assemblies 62 may be selected to equal the number of feed-through connector assembly 72 on the sleeve 76. However, more or less electrical contact assemblies 62 relative to feed-through connector assemblies 72 may be employed for various reasons, including manufacturing considerations that provides ease of alignment between the two assemblies.

At each tool section 80, multiple feed-through connector assemblies 72 are azimuthally located in the sleeve 76. The number of feed-through connector assemblies can be varied to achieve desirable results of reducing borehole eccentricity effects. Alternatively feed-through connector assemblies 72 may comprise a ring or partial ring extending azimuthally across the outer surface of the sleeve 76.

Electrodes 74 are provided on the outside diameter (OD) of the sleeve 76. The electrodes 74 are made of conductive materials, for example, metals and contact with feed-through connector assemblies 72. One function of the feed-through connector assemblies 72 is to establish the electrical continuity from the electrodes 74 to the metallic array mandrel 69, in order to short out borehole currents. The borehole currents will flow from the electrode 74, through the feed-through connector assemblies 72 and the electrical contact assemblies 62, to the metallic array mandrel 69. Another function of the feed-through connector assemblies 72 is to prevent the downhole fluids getting inside the tool, or the sonde oil leaking from the tool to the environment.

Figure 9:
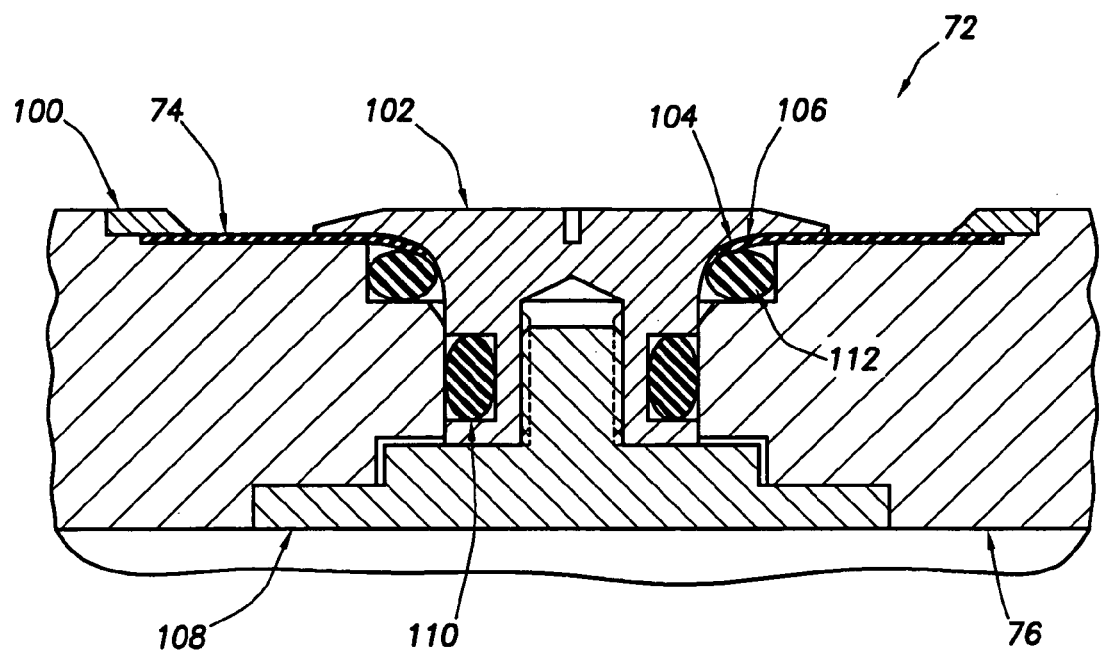
FIG. 9 is a cross section view illustrating a sleeve having an electrode assembly in an engaged position according to the disclosed subject matter.

Turning now to FIG. 9, shown is a cross-section view of the sleeve 76 at a location that includes a feed-through connector 72. According to a feature of the disclosed subject matter, a design is achieved that satisfies both goals of providing conductivity from the borehole to the inner portion of the sleeve 76 while providing a sealed connection prevent passage of borehole fluid from the borehole through the sleeve 76 or leakage of fluids used within the tool into the borehole through the sleeve 76.

According to one embodiment the sleeve 76 is made of non-conductive materials, which will not electrically couple to the sonde responses. Thermal plastics with high glass transient temperatures are preferred, for example, PEEK, Torlon, and etc., because they can take higher downhole temperatures. Although thermal plastics are preferred for ease of the machining process, other non-conductive materials may be used where effective sealing can be achieved.

FIG. 9 illustrates a specific embodiment utilizing a two-piece feed-through connector 72. When fully engaged, a connector cap 102 contacts both an electrode 74 and a contact pad 108. The connector cap 102 and the contact pad 108 are preferably made of metallic materials, although other conductive materials could be used, such as conductive plastics. The connector cap 102 is screwed onto the contact pad 108 via a thread as shown. The connector cap 102 has one or more recessed regions suitable for placement of seals, such as seal 110 to provide sealing from the outer surface to the inner surface of the sleeve 76. Other types of sealing is also feasible.

Positioned beneath a portion of the connector cap 72, electrode 74 is preferably imbedded on the OD of the sleeve 76. The electrode is made of conductive materials, for example, metallic materials or conductive plastics. The Electrode 74 can be glued on the sleeve, then potted with fiber-glass or epoxy, rubber 100 to prevent the electrodes get torn off. Other ways of attaching the electrodes to the sleeve that provide protection to the electrode while allowing conductive contact with the borehole fluid are within the scope of the disclosed subject matter.

In order to ensure positive contact between the Electrode 74 and the connector cap 102, according to one embodiment, the inner profile 104 of the fringe portion of the connector cap 102 is preferably designed to have certain amount of interference with the spring portion 106 of the electrode 74.

Figure 10:
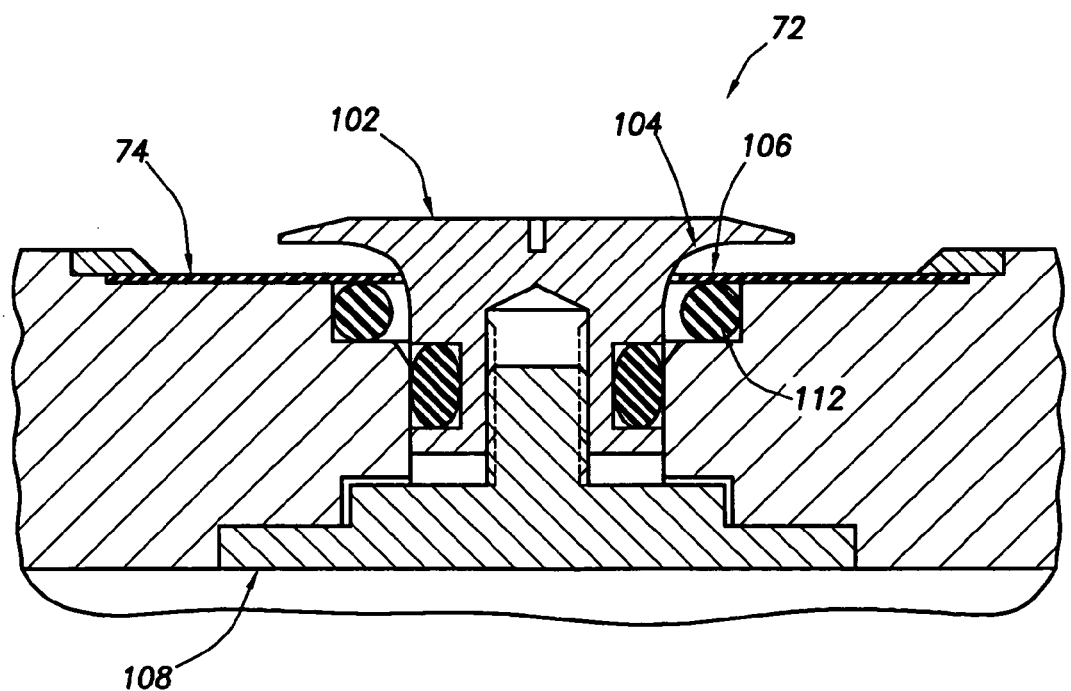
FIG. 10 is a cross section view illustrating a sleeve having an electrode assembly in an disengaged position according to the disclosed subject matter.

This interference design is shown in more detail in FIG. 10 that illustrates a non-engaged state of connector cap 102 and contact pad 108. P portion 106 of the electrode 74 is not deformed, as shown in FIG. 10, and there is no contact between the connector cap 102 and the Electrode 74.

In FIG. 9, when the connector cap 102 and the contact pad 108 are fully engaged, the inner profile 104 of the fringe portion of the connector cap 102 elastically deforms the spring portion 106 of the electrode 74. In this case, the spring force provided by the deformation of the spring portion 106 of the electrode will ensure positive contact between the electrode 74 and the connector cap 102.

In order to further ensure this spring force, a spring device 112 can be placed below the spring portion 104 of the electrode to reinforce or energize the contact. This spring device can be made of rubber or metallic materials, as long as it can deform to provide certain spring force. For example, the spring device can be a rubber o-ring, metallic coil spring, wave washer, and etc.

In this case, the electrical continuity from the electrode 74, through the connector cap 102, to the contact pad 108 is established. At the same time, the seal 110 provides the sealing between the inside of the tool and the outside environment. When the sleeve slides over the array, the contact pad 108 will engage with the electrical contact assemblies 62, as shown in FIG. 8.

As can be seen from FIGS. 9 and 10, the electrode assembly can comprise multiple components to provide a complete conductive path from the outer surface of the sleeve, or the outer surface of the tool, and the inner surface of the sleeve. However, it should be noted that many variations of this design can be employed by combining or splitting the components described herein. Although not required, at least a two component approach in the form of a top and bottom conductor has been found to streamline the manufacturing process. Specifically, using at least a two component design, in assembly a bottom conductor is held in place from within the center of the sleeve while the top conductor is lowered onto the bottom conductor from a directional external to the sleeve.

Furthermore, it should be noted the conductor design, whether it be two or more components, is manufactured and assembled independent of the creation of the sleeve. This is one improvement over prior sleeves which impregnated conductors within the process of building the sleeve. The independent design of the conductors then allows for ease of manufacture allowing assembly of the conductor as a separate process from the molding or similar process of the sleeve. Furthermore, the independent design provides significant advantage for maintenance and repair. Specifically, the electrodes may be removed and replaced without destructing the sleeve. For example, according to one embodiment of the invention, the sleeve is formed as a tubular cylinder of thermoplastic material. The sleeve is then machined to form the seats for the electrode assemblies. The conductors are then placed in the sleeve seats and engaged into position. The protective layer surrounding the electrode can be removed with relative ease and does not require destruction of the sleeve in order to remove the electrode assembly.

Figure 11:
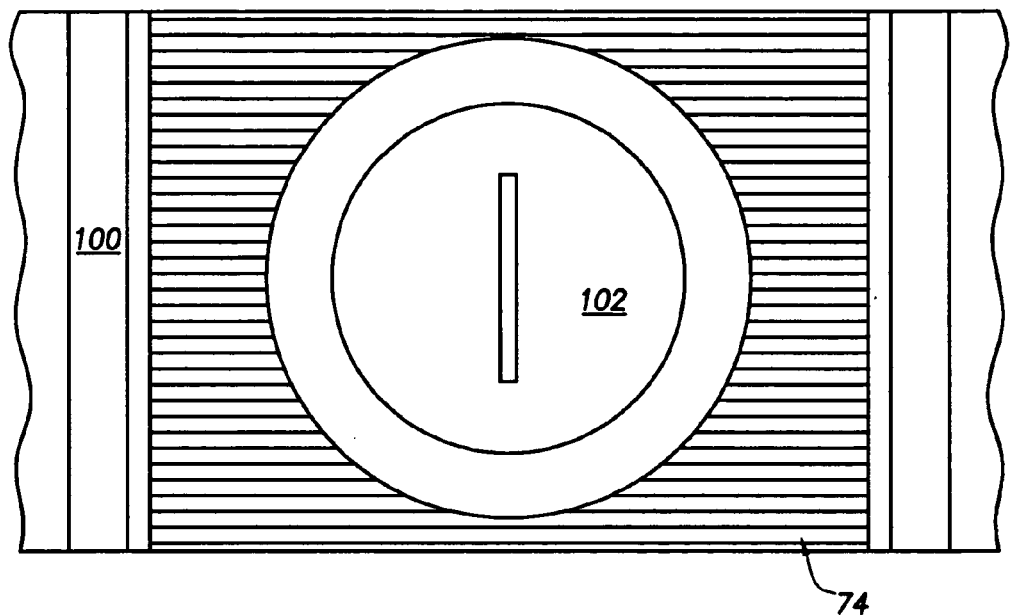
FIG. 11 is a top view illustrating an electrode and a conductor on the surface of a sleeve according to one embodiment of the disclosed subject matter.

Turning now to FIG. 11, shown is a top view of the outer surface of sleeve 76 with the connector cap 102 placed over the electrode 74. As disclosed herein, according to one embodiment, the electrode 74 is comprised of several sets of metallic fingers that comprise a continuous current path across the surface area of the electrode 74. The alignment of the fingers is preferably parallel to the tool axis, although in some cases, a tilted or perpendicular alignment may be employed to provide attract enhanced borehole current flow. The fingered electrode design prevents the formation of large eddy current loops, unlike a continuous piece of a conductive sheet.

Figure 12:
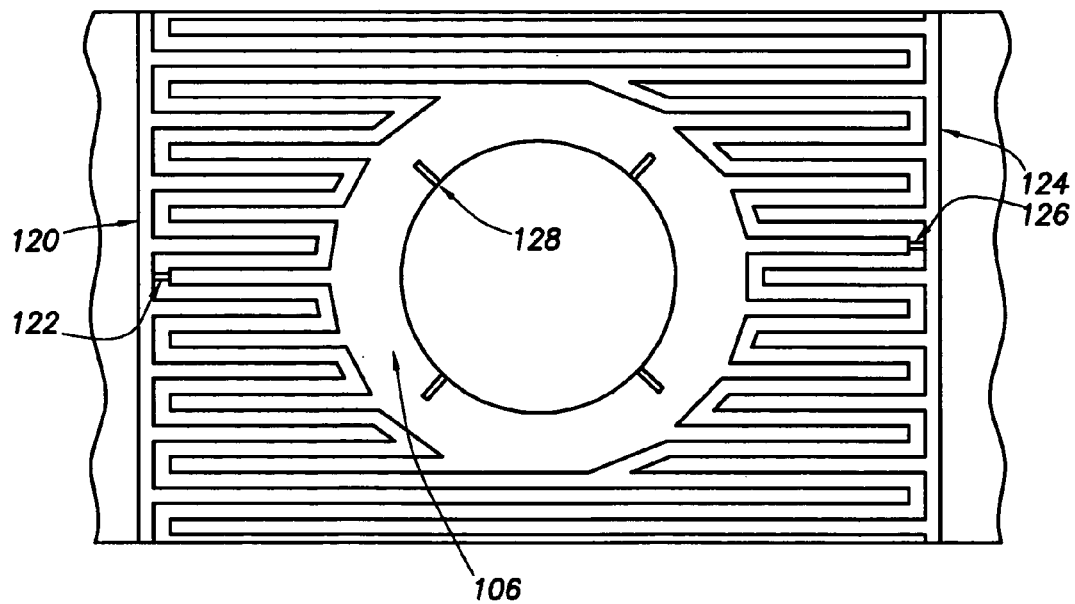
FIG. 12 is a top view illustrating an electrode on the surface of a sleeve according to one embodiment of the disclosed subject matter.

FIG. 12 illustrates the electrode 74 configuration according to a embodiment employing conductive fingers. The continuous conductive path comprising electrode 74 is more clearly shown. The electrode fingers are designed to allow as few closed loops as possible for eddy current to flow around yet allow for relatively unconstrained current flow across the surface area of the electrode 74 to the connector cap 102. Some of the conductive fingers (the darkened portions are conductive) extend from the left side 120 of the electrode; some of the fingers extend from the right side 124. According to an embodiment, the electrode 74 may also employ some fingers extending from the centers 106 of the electrode. Besides connections 122 between the centers and the sides of the electrode, there is no other closed links to form loops. According to other embodiments, some fingers may be eliminated for various reasons, such as ease of manufacturing or increased strength. For example, an electrode may be employed without the fingers extending from either side 120 or 124 of the electrode, for example to allow for wider fingers from the center 106 for the purpose of mechanical strength.

Also shown in FIG. 12 are several cuts 128 on the spring portion 106 of the electrode 74 to facilitate the deformation of the spring portion 106, when the connector cap 102 engages the conductive contact pad 108. Such cuts 128 are preferred to prevent bowing of electrode 74 but are not a required design option.

Figure 13:
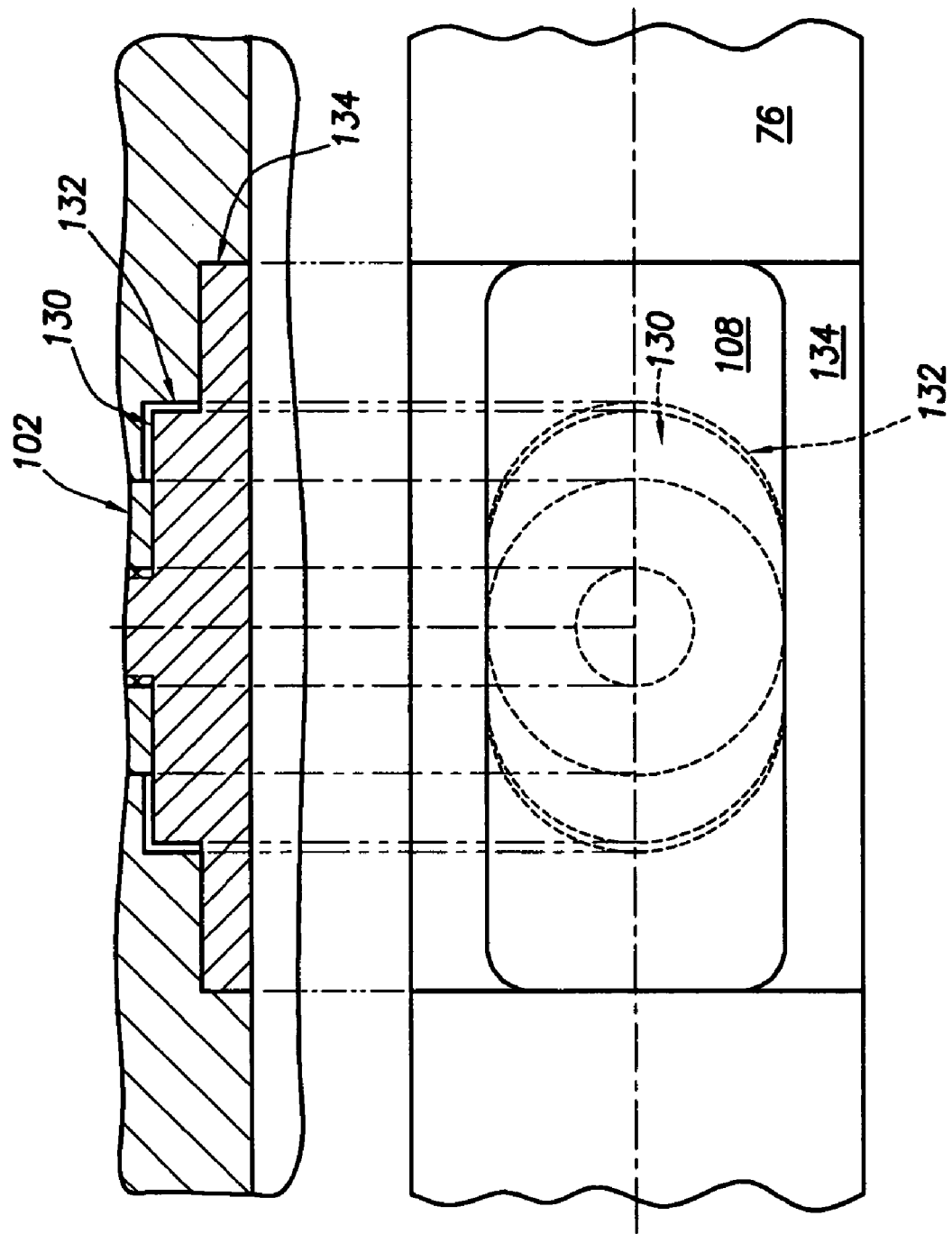
FIG. 13 illustrates multiple views of a bottom conductor of a sleeve according to one embodiment of the disclosed subject matter.

Turning now to FIG. 13, The upper portion of the FIG. 13 provides part of the cross-section view. The lower portion of the FIG. 13 shows the view from the inside diameter (ID) of the sleeve. According to one embodiment, recess 134, which could alternatively be 360° in the azimuthal direction, is located on the on the ID of the sleeve 76. The recess provides that the bottom of the contact pad 108 be flush with the ID of the sleeve 76. Proper fit is important to will facilitate the sliding of the sleeve over the tool array, not shown.

The dimensions of the pad 108 are preferably large enough to accommodate the differences of thermal expansion of sleeve material, e.g. plastics, with larger thermal expansion coefficients and the internal components, e.g. ceramics, with smaller thermal expansion coefficients. By properly considering the thermal characteristics, there will always be contact between the contact pad 108 and the electrical contact assembly 62, as shown in FIG. 8. Alternatively, a design might employ a pad 108 having dimensions large enough that thermal expansion has no effect on the alignment of the electrical contact assembly 62 and the conductive pad 108. Similarly, an alternative design of the electrical contact assembly 62 can achieve a similar effect, e.g. azimuthal contact instead of a point contact.

Continuing in FIG. 13, there is another recess 132 that has a matching profile of the mid section 130 of the contact pad. This feature helps prevent the contact pad 108 from rotation. This is particularly important during assembly when the connector cap 102 is screwing onto the contact pad 108.

Figure 14:
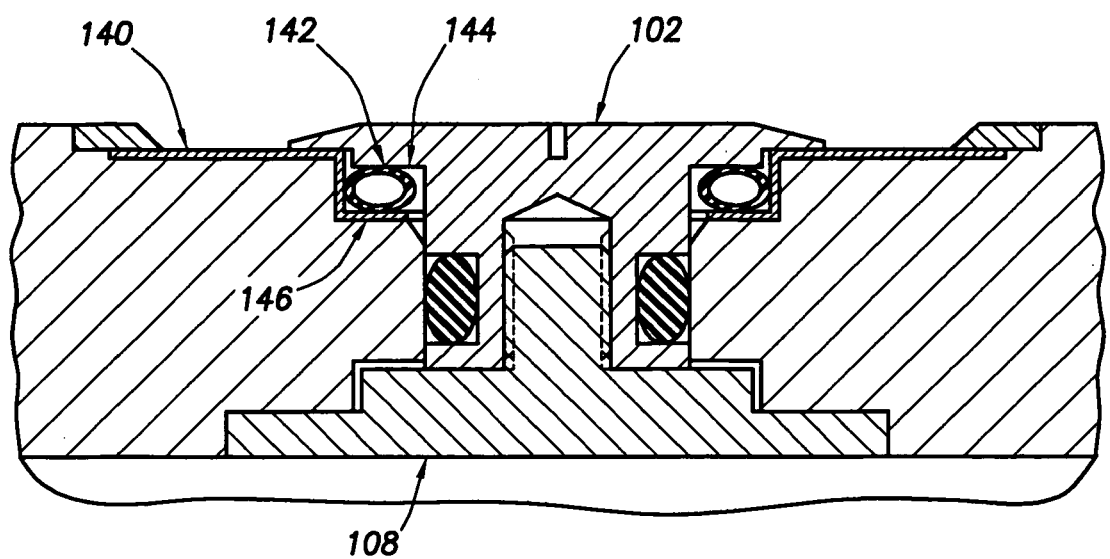
FIG. 14 is a cross section view illustrating a another embodiment of a sleeve having an electrode assembly in an engaged position.

Turning now to FIG. 14, shown is another embodiment to achieve the contact between a surface electrode and a connector cap. The contact element 142 is placed between the fringe portion 144 of the connector cap 102 and the contact portion 146 of the electrode 140. The contact element 142 is made of a conductive material, for example, metals, conductive plastic, etc. When the connector cap 102 is fully engaged with the contact pad 108, the contact element 142 is elastically deformed to energize the contact between the electrode 140 to the contact element 142, and the contact between the contact element 142 and the connector cap 102. In this case, the electrical continuity between the electrode 140 and the connector cap 102 is established.

The cross section of the contact element 142 can be a continuous circle, as shown in FIG. 14. It can also have other geometries for the cross-section. For example, it could be C-shaped, V-shaped rotated 90 degrees, or other geometries with potentials to be elastically deformed. Further, although the electrode, connector cap and contact pad have been described according to the embodiments of the figures, other designs fall within the claimed invention. For example, two or more of the components may be combined, e.g. combination of the electrode with the connector cap or the connector cap with the contact element or the contact pad with the electrode, etc.

Figure 15:
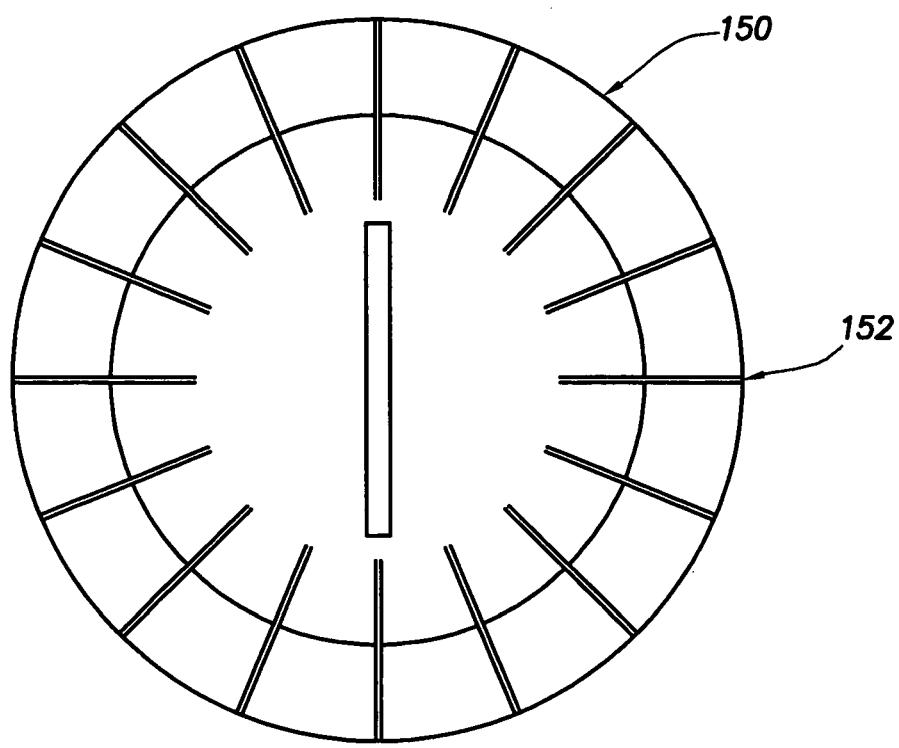
FIG. 15 is a top view of a top conductor having radial slots according to another embodiment of the disclosed subject matter.

Turning now to FIG. 15, according to yet another embodiment, the connector cap design can be modified for certain efficiencies. For example, in order to prevent a large continuous surface on the connector cap to let the eddy current to flow, part of the connector cap 150 can be sliced by multiple cuts 152 to divide a large continuous surface into a broken, yet connected surface. This design serves the same function as the "finger electrodes" described in FIGS. 11 and 12 to minimize the eddy current loops.

Those skilled in the art will appreciate that the sleeve structures of the invention are not limited to use in any one particular type of measurement or exploration operation, and that they may be disposed within a borehole on any type of support member, e.g., on coiled tubing, drill collars, or wireline tools.

For the purposes of this specification it will be clearly understood that the word "comprising" means "including but not limited to", and that the word "comprises" has a corresponding meaning. While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The foregoing description of the present invention has been presented for purposes of illustration. It is to be noted that the description is not intended to limit the invention to the various apparatus, systems, and methods disclosed herein. Various aspects of the invention as described above, may be applicable to other types of well logging or measurement tools, for examples, or different arrangements for an induction or resistivity type tool. Such variations of the invention will become apparent to one provided with the present disclosure and skilled in the petroleum, geological, petrophysical, or other relevant art. Consequently, variations and modifications commensurate with the above teachings, and the skill and knowledge of the relevant art, are within the scope pf the present invention. The embodiments described and illustrated herein are further intended to explain the best modes for practicing the invention, and to enable others skilled in the art to utilize the invention and other embodiments and with various modifications required by the particular applications.

What is claimed is:

1. A method for resistivity logging including reduced borehole current effects using a logging tool disposed in a borehole, wherein the logging tool includes an inner conductive mandrel at least partially surrounded by an outer sleeve, includiug at least one surface electrode and at least one antenna having a magnetic dipole, the method comprising:

providing a first conductor on an outer surface of the sleeve exposed to the exterior of the well logging tool, and at least one second conductor positioned about the inner conductive mandrel in conductive connection therewith and conductively connected to the first conductor and exposed to an inner surface of the sleeve;

transmitting an electromagnetic energy from a transmitter antenna on the logging tool into a formation;

providing a current path allowing currents in the borehole to flow through at least one radially conductive path between the inner conductive mandrel and the outer surface of the sleeve, the radially conductive path including the first conductor, the second conductor, and the inner conductive mandrel;

sealing at least one of the first conductor or the second conductor with the sleeve to prevent passage of fluid Through the sleeve; and measuring an induced signal in a receiver antenna on the logging tool.

2. The method of claim 1, the step of sealing comprising at least one seal surrounding a portion of the at least one radially conductive path arranged to provide a fluid seal between an exterior of the logging tool and an inner surface of the outer sleeve.

3. The method of claim 2, wherein the seal comprises a plurality of seals.

4. The method of claim 1, wherein the surface electrode comprises a plurality of slots extending across a portion of an external surface of the sleeve, the plurality of slots for minimizing eddy currents on the surface electrode.

5. The method of claim 4, the surface electrode further comprises a connecting region for conductively connecting to the inner conductive mandrel.

6. The method of claim 4, wherein the plurality of slots comprise a first plurality of slots formed in an azimuthal direction about the longitudinal axis of the sleeve and a second plurality of slots formed in a direction parallel to the longitudinal axis of the sleeve.

7. The method of claim 4, wherein the surface conductor comprises a deforrnable portion for conductively coupling to the inner conductive mandrel.

8. The method of claim 1, wherein the current path comprises a spring adapted to form dynamic contacts with the at least one second conductor and the conductive mandrel.

* * * * *